(12) United States Patent
Quere et al.

(10) Patent No.: US 12,130,501 B2
(45) Date of Patent: Oct. 29, 2024

(54) METHOD FOR DETERMINING AN OPTICAL EQUIPMENT ADAPTED TO A WEARER AND PROCESSING DEVICE FOR DETERMINING AN OPTICAL EQUIPMENT ADAPTED TO A WEARER

(71) Applicant: Essilor International, Charenton-le-Pont (FR)

(72) Inventors: Loic Quere, Charenton-le-Pont (FR); Bruno Amir, Charenton-le-Pont (FR); Jérôme Moine, Charenton-le-Pont (FR); Olivier Roussel, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 726 days.

(21) Appl. No.: 17/292,580

(22) PCT Filed: Nov. 4, 2019

(86) PCT No.: PCT/EP2019/080123
§ 371 (c)(1),
(2) Date: May 10, 2021

(87) PCT Pub. No.: WO2020/099169
PCT Pub. Date: May 22, 2020

(65) Prior Publication Data
US 2022/0004023 A1      Jan. 6, 2022

(30) Foreign Application Priority Data

Nov. 12, 2018   (EP) .................... 18315039

(51) Int. Cl.
*G02C 7/02* (2006.01)
*G02C 13/00* (2006.01)

(52) U.S. Cl.
CPC .......... *G02C 7/027* (2013.01); *G02C 13/005* (2013.01)

(58) Field of Classification Search
CPC .... G02C 7/027; G02C 13/005; G02C 13/003; G02C 5/001; B29D 12/02
(Continued)

(56) References Cited

U.S. PATENT DOCUMENTS 9,341,867 B1    5/2016 Kim
2010/0026955 A1   2/2010 Fisher et al.
(Continued)

FOREIGN PATENT DOCUMENTS

EP    2 028 529 A1    2/2009
WO   WO 2008/049173 A1   5/2008
WO   WO 2014/195471 A1   12/2014

OTHER PUBLICATIONS

International Search Report and Written Opinion issued on Feb. 10, 2020 in PCT/EP2019/080123 filed on Nov. 4, 2019.

*Primary Examiner* — Tuyen Tra
(74) *Attorney, Agent, or Firm* — Oblon, McClelland, Maier & Neustadt, L.L.P.

(57) ABSTRACT

A method and device for determining an optical equipment adapted to a wearer and comprising an optical lens and a spectacle frame, the method including providing data relative to the wearer comprising optical requirements of the wearer, providing an optical cost function related to an optical function parameter of the optical lens and being defined based at least on part of the data relative to the wearer, providing a comfort cost function related to a comfort parameter, providing a mechanical interaction cost function that varies as a function of a geometrical parameter of spectacle frame and a geometrical parameter of optical lens, and determining an optical equipment that minimizes (Continued)

a global cost function, the global cost function being a weighted sum of all cost functions.

11 Claims, 1 Drawing Sheet

(58) Field of Classification Search
USPC .................................................. 351/200, 205
See application file for complete search history.

(56) References Cited

U.S. PATENT DOCUMENTS

| | | |
|---|---|---|
| 2010/0283967 A1 | 11/2010 | Dubois et al. |
| 2016/0124246 A1 | 5/2016 | Rego et al. |
| 2016/0252751 A1 | 9/2016 | Kim |

Fig.1
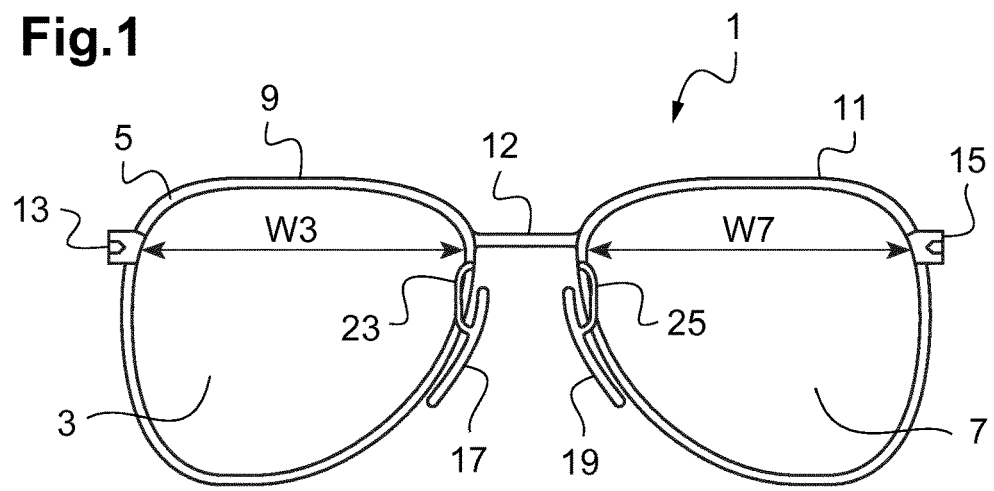
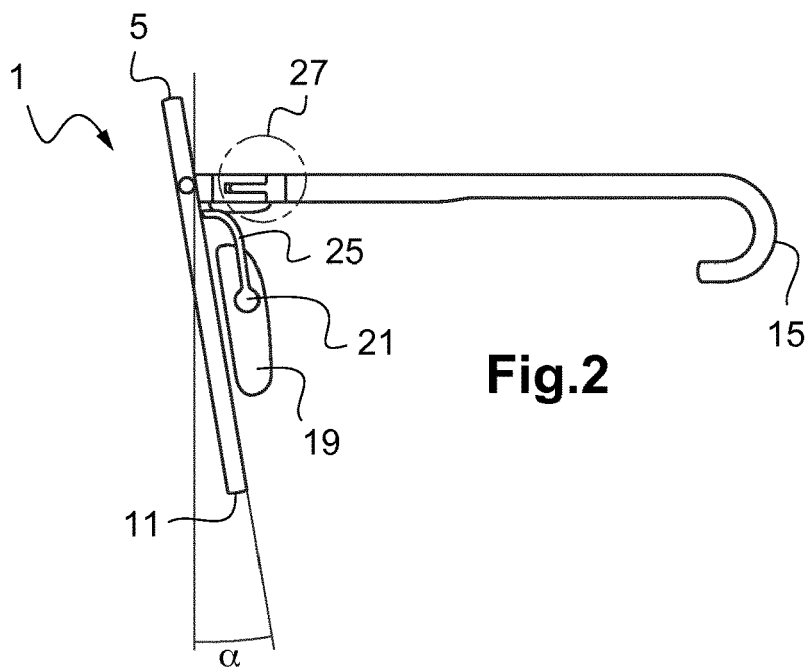
Fig.2
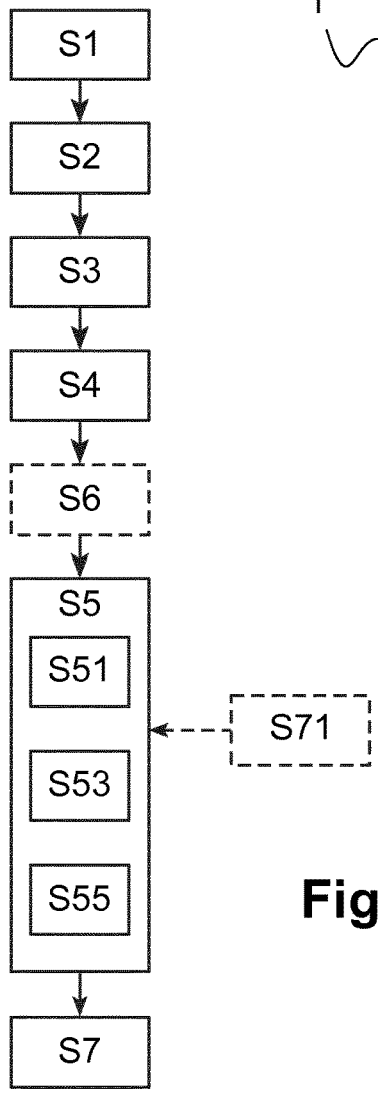
Fig.3

METHOD FOR DETERMINING AN OPTICAL EQUIPMENT ADAPTED TO A WEARER AND PROCESSING DEVICE FOR DETERMINING AN OPTICAL EQUIPMENT ADAPTED TO A WEARER

TECHNICAL FIELD OF THE INVENTION

The invention relates to the design of optical equipment.

More precisely the invention relates to a method for determining an optical equipment adapted to a wearer, the optical equipment comprising an optical lens and a spectacle frame.

The invention also relates to a method for manufacturing the optical equipment and to an optical element.

BACKGROUND INFORMATION AND PRIOR ART

Recent improvements in the field of ophthalmic lenses manufacturing have allowed providing a wearer with tailored optical equipment. For example, the wearer first chooses a spectacle frame. Since spectacle frames are usually designed for a standard wearer, they may not fit a particular wearer. The wearer's morphological parameters, such as nose shape and face width, may, then, be determined. The geometry of the chosen spectacle frame can be modified to fit wearer's morphological parameters, and a model of the chosen spectacle frame tailored to the wearer may be produced.

However, changing the geometry of the spectacle frame to better fit the wearer has an impact on the geometry of the optical lenses, or on the mounting and fitting of the optical lens into the spectacle frame. Modifying the geometry of the optical lenses may in turn modify their optical function. Yet, it is primordial that the optical function provides the wearer with an adapted optical correction.

In this respect, document WO2014/195471 describes a method for optimizing an optical equipment for a wearer, taking into account the optical function of the optical lens as well as a comfort criterion.

SUMMARY OF THE INVENTION

Therefore one object of the invention is to provide a method for determining an optical equipment adapted to a wearer, the optical equipment comprising an optical lens and a spectacle frame, the method being implemented by a processing device and comprising steps of:

providing data relative to the wearer comprising optical requirements of the wearer, providing an optical cost function, the optical cost function being related to an optical function parameter of the optical lens and being defined based at least on part of the data relative to the wearer, providing a comfort cost function, the comfort cost function being related to a comfort parameter, providing a mechanical interaction cost function, the mechanical interaction cost function varying as a function of a geometrical parameter of the spectacle frame and a geometrical parameter of the optical lens, determining the optical equipment that minimizes a global cost function, the global cost function being a weighted sum of the optical cost function, the comfort cost function and the mechanical interaction cost function.

For example, optical lenses correcting myopia (negative lenses) have a periphery thicker than their center. Furthermore, the thickness of the periphery increases as the size of the optical lens increases. In case a wearer with a strong myopia wishes or requires a large spectacle frame (and as a consequence large optical lenses with thick edges), the edges of the optical lenses might be in contact the hinges, the temple or the nose pad of the spectacle frame. The mechanical forces, then exerted on the optical lenses by the spectacle frame may damage them.

On the contrary, optical lenses correcting hyperopia (positive lenses) have a periphery thinner than their center. In case a wearer with a strong hyperopia wishes or requires a large spectacle frame, then the periphery of the lens will be thin. In the case of a rimless spectacle frame, holes are drilled into the optical lens, near the periphery, in order to assemble the temple. It is primordial that the optical lens is thick enough, so the mechanical forces exerted during the drilling do not break them.

Thanks to the method of the invention, it is possible to take into account the various parameters of the optical equipment, and to optimize them so that none of the parameter is detrimental to the others, or so as to obtain the best compromise between the parameters.

Other advantageous and non-limiting features of the method according to the invention include:

the mechanical interaction cost function is arranged so as to be minimum when the optical lens only interfere with the rim, the mechanical interaction cost function is arranged so as to be minimum when a contour shape of a peripheral edge of the optical lens is sensibly similar to a contour shape of an inner peripheral edge of the rim, the mechanical interaction cost function is arranged so as to be minimum when the thickness of a peripheral edge of the optical lens is greater than a thickness threshold, the thickness being considered at least locally, the mechanical interaction cost function is arranged so as to be minimum when a visibility of a peripheral edge of the optical lens mounted in the rim is minimum, the geometrical parameter of the spectacle frame is selected from a group comprising:
a contour shape of a rim of the spectacle frame,
an at least local thickness of the rim of the spectacle frame,
a shape of a temple of the spectacle frame,
a position of a hinge on the spectacle frame,
a position of a nose pad of the spectacle frame,
a shape of a nose pad of the spectacle frame a base curve of the rim of the spectacle frame,
an absence of rim,
a geometry of a groove of the spectacle frame adapted to cooperate with a bevel of the lens, the geometrical parameter of the optical lens is selected from a group comprising:
a thickness constraint of the optical lens, particularly a thickness of the peripheral edge of the optical lens,
a base curve of the optical lens,
a bevel geometry of the optical lens,
a groove of the optical lens,
a size of the optical lens, particularly a width of the optical lens, the data relative to the wearer further comprises morphology data related to the morphology of the wearer, the geometrical parameter of the spectacle frame is determined based on the morphology data, the comfort parameter is selected from a group comprising:
a weight of the optical equipment, a distance between a part of the face of the wearer and the optical equipment when worn by said wearer,
a length of the temple,
a shape of the nose pad,
a shape of the spectacle frame,
a pantoscopic angle,
a wrap angle,
the optical function parameter is selected from a group comprising:
equations of surfaces of the optical lens,
relative positions of said surfaces,
a refractive index of the material forming the optical lens,
optical power of the optical lens,
optical power distribution over the optical lens for progressive addition lenses,
astigmatism distribution over the optical lens,
distortion, field of vision for progressive addition lenses,
the method further comprises an optional step of providing an esthetic cost function related to an esthetic parameter,
the esthetic parameter is selected from a group including:
a spectacle frame contour shape,
a visibility of an edge of the optical lens,
a color of the optical equipment,
a decorative pattern on the spectacle frame,
the global cost function is a weighted sum of the optical cost function, the comfort cost function, the mechanical interaction cost function and the esthetic cost function,
the method further comprises steps of:
providing a model of the optical equipment having a plurality of parameters, the parameters including an initial geometrical parameter of the optical lens adapted to the optical requirements of the wearer, and an initial geometrical parameter of the spectacle frame,
evaluating the global cost function of the model of the optical equipment,
modifying a parameter of the model of the optical equipment,
the evaluating step and modifying step are repeated so as to minimize the difference between the global cost function and a target value of the global cost function,
at least the geometrical parameter of the optical lens and the geometrical parameter of the spectacle frame are modified during the modifying step,
the parameters of the model further include a comfort parameter and an esthetic parameter,
the comfort parameter and the esthetic parameter are modified during the modifying step,
the model parameters are further selected from a group including:
a material of the optical lens,
a coating of the optical lens,
a material of the spectacle frame,
a weight distribution of the spectacle frame,
a weight distribution of the optical lens,
the further model parameters are be modified during the modifying step,
the method further comprises a step of:
providing data descriptive of a manufacturing system,
the parameters of the model of the optical equipment include the manufacturing system data.
the method further comprises step of:

determining an optical equipment adapted to a wearer,
manufacturing the determined optical equipment with the manufacturing system,
the manufacturing system includes at least an additive manufacturing machine.

The invention also relates to an optical equipment adapted to a wearer, having constructional characteristics determined by the method.

The invention also relates to a processing device for determining an optical equipment adapted to a wearer, the optical equipment comprising an optical lens and a spectacle frame, the processing device comprising a microprocessor, a memory storing a computer program, the computer program being adapted to execute the following steps when executed by the microprocessor:
providing data relative to the wearer comprising optical requirements of the wearer,
providing an optical cost function, the optical cost function being related to an optical function parameter of the optical lens and being defined based at least on part of the data relative to the wearer,
providing a comfort cost function, the comfort cost function being related to a comfort parameter,
providing a mechanical interaction cost function, the mechanical interaction cost function varying as a function of a geometrical parameter of the spectacle frame and a geometrical parameter of the optical lens, and
determining the optical equipment that minimizes a global cost function, the global cost function being a weighted sum of the optical cost function, the comfort cost function (C) and the mechanical interaction cost function.

DETAILED DESCRIPTION OF EXAMPLE(S)

The method and intermediate optical element according to the invention will be described next, in reference with the appended drawings.

On the appended drawings:
FIG. 1 illustrates a schematic front view of an optical equipment manufactured according to the method of the invention,
FIG. 2 illustrates a schematic side view of the optical equipment represented on FIG. 1, and
FIG. 3 is a schematic representation of the steps of the method according to the invention.

FIG. 1 represents an optical equipment 1 manufactured according to the method of the invention. Optical equipment 1 comprises an optical (or ophthalmic) lens 3 and a spectacle frame 5. Here, optical equipment 1 comprises another optical (or ophthalmic) lens 7.

Spectacle frame 5 comprises rims 9, 11 in which the optical lenses 3, 7 are mounted. Rims 9, 11 of spectacle frame 5 are linked by a bridge 12.

Spectacle frame 5 comprises temples 13, 15, or sides, and nose pads 17, 19 so as to maintain spectacle frame 5 on the wearer.

Each pad 17, 19 is linked to one of rims 9, 11 via a pad arm 23, 25. As represented on FIG. 2, pads 19 are linked to pad arm 25 via a stud 21.

Temples 13, 15 are linked to rims 9, 11 by an hinge 27 at one end of the side, the other end of the side being arranged so as to be in contact with the wearer's pinna.

Optical equipment 1 adapted to the wearer is determined by a method comprising steps represented in FIG. 3.

The method for determining optical equipment 1 adapted to the wearer comprises:

a step S1 of providing data relative to the wearer comprising optical requirements of the wearer, a step S2 of determining an optical cost function O related to an optical function parameter of the optical lens 3, 7 and being defined based at least on part of the data relative to the wearer, a step S3 of providing a comfort cost function C, the comfort cost function C being related to a comfort parameter, a step S4 of providing a mechanical interaction cost function M, the mechanical interaction cost function M varying as a function of a geometrical parameter $g_f$ of the spectacle frame 5 and a geometrical parameter $g_l$ of the optical lens 3, 7, a step S5 of determining an optical equipment 1 that minimizes a global cost function G, the global cost function G being a weighted sum of the optical cost function O, the comfort cost function C and the mechanical interaction cost function M.

During step S5, geometrical parameter $g_f$ of the spectacle frame 5 and/or geometrical parameter $g_l$ of the optical lens 3, 7 are modified, so that global cost function G is modified and gets closer to a target value.

Preferably, at least one geometrical parameter $g_f$ of the spectacle frame 5 and at least one geometrical parameter $g_l$ of the optical lens 3, 7 are both modified during step S5.

The method is, for example, implemented by a processing device. The processing device comprises, for example, a microprocessor and a memory. The memory of the processing device stores a computer program adapted to implement the method for determining optical equipment 1 as described below, when executed by the microprocessor.

During step S1, data relative to the wearer are provided. The data is, for example, provided to the processing device.

The data relative to the wearer comprise optical requirements of the wearer. The optical requirements of the wearer comprise all type of requirements of the wearer relating to the optical function of optical equipment 1. For example, the optical requirements may be selected individually or in combination from a group comprising, but not limited to: filtration requirements such as transmission function requirements, reflection function requirements, and/or absorption function requirements.

The wearer data may include initial spectacle frame choice data, relating to an initial chosen spectacle frame. The initial spectacle frame is, for example, chosen by the wearer. The initial spectacle frame data include, but is not limited to, initial shape, initial weight, initial hue, initial dimensions.

The data relative to the wearer may be selected individually or in combination from a group comprising, but not limited to: the prescription of the wearer, the head/eye movement strategy of the wearer, the wear conditions.

The data relative to the wearer may include morphological data of the wearer relative to any anatomical features of the face and head of the wearer.

The morphological data of the wearer may be selected individually or in combination from a group comprising, but not limited to:

eye features such as the interpupillary distance of the wearer, the position of the center of rotation of each eye of the wearer and anatomical surface features of the eye and/or eyelids (for example, the medial angle, the lateral angle, the medial commissure, the lateral commissure, the medial canthus, the lateral canthus, the lacarimal caruncle, the nasojugal fold, the lower eyelid margin, and the palperai fissure), nose features such as shape and location of the nose, tip and/or side data of the nose, ear features such as shape and position of the pinna of the wearer, in particular the junction between the upper part of the pinna and the head the complexion of the wearer, lip features, temples or temporal zones features, eyebrow features, face features such as face shape (oval, round, rectangular, square, triangular), features of hairline, features of the area from the forehead to the cheek.

Advantageously, the morphological wearer data may include data on the head and face contact zones with optical equipment 1 and more particularly, the specific position and/or shape and/or spatial extension and/or orientation of the facial and head zones which support the mechanical contact with optical equipment 1 such as the temples of the wearer and the sides of the nose, when optical equipment 1 is worn by the wearer.

These morphological data of the wearer can be provided by any known method such as a 3D scanning method and/or pictures of the face and profile of the wearer.

The data relative to the wearer may include functional preference data relative to optical lens functions sensitive to optical lens geometry and/or positioning with respect to the face of the wearer.

More particularly, functional data relate to the position and the orientation of the lens relative to the axis of sight of the wearer and/or the curvature of the front and rear faces of the optical lens and/or boxing lens data.

Functional preference data can refer to desired filtering properties such as transmission and/or absorption and/or reflection properties of optical lens 3, 7. For example, optical lens 3, 7 shall have a desired level of UV protection, a desired gradient of transmission.

During step S2, optical cost function O related to an optical function parameter of optical lens 3, 7 and defined based at least on part of the data relative to the wearer is determined. Step S2 is, for example, implemented by the processing device.

The optical function parameter may be based on optical requirements of the wearer. The optical function parameter may also be based on morphological data of the wearer such as the geometry and relative positions of the face and/or head zones which are to be in contact with the optical equipment, and the interpupillary distance of the wearer.

The optical function parameter is selected may be selected individually or in combination from a group comprising, but not limited to:

equations of surfaces of the optical lens, relative positions of said surfaces, a refractive index of the material forming the optical lens, optical power distribution over the optical lens for progressive addition lenses, astigmatism distribution over the optical lens, distortion, field of vision for progressive addition lenses.

The optical cost function O can be, for example, calculated as the deviation between the optical power distribution over the optical lens, within the contour shape of the edge of optical lens 3, 7, and the optical requirement of the wearer.

The following optical cost function O may for example be used:

$$O = \Sigma_{x,y} \alpha_{x,y} (S_e(x,y) - S_{or}(x,y))^2$$

where (x, y) are local coordinates on the optical lens 3, 7, $S_e$ corresponds to a spherical and/or cylindrical and/or prismatic and/or cylinder axis and/or distortion optical parameter, $S_{or}$ corresponds to the optical requirement of the wearer, and $\alpha_{x,y}$ corresponds to weighting parameters depending on (x, y) coordinates.

During step S3, comfort cost function C is provided. The comfort cost function C is related to a comfort parameter.

The comfort parameter is selected from a group comprising, but not limited to:
- a weight of the optical equipment 1,
- a distance between a part of the face of the wearer and the optical equipment 1 when worn by said wearer,
- a length of the temple 13, 15,
- a shape of the nose pad 17, 19,
- a shape of spectacle frame 5,
- a pantoscopic angle α of spectacle frame 5,
- a wrap angle.

The weight of the optical equipment 1 includes, for example, the total weight of the optical equipment 1. Generally, the lighter the optical equipment 1 is the more comfortable it may be considered. For example, the comfort cost function may be arranged so as to be minimum when the weight of the optical equipment 1 is minimum.

The weight of the optical equipment 1 includes, for example, the weight repartition between the front and back sides of the optical equipment 1 and/or between the left and right sides.

For example, the comfort cost function C is arranged so as to be minimum when the difference of weight of the optical equipment 1 between the right and left sides 13, 15 corresponds to a weight difference predetermined value.

The distance between a part of the face of the wearer and the optical equipment 1 includes, for example, the distance between a free end of the lashes and/or the eyebrows of the wearer and the optical lens 3, 7. Generally, it is preferable that the lashes of the wearer do not touch the optical lens 3, 7 as the lashes might stain the optical lens 3, 7.

For example, the comfort cost function C may be arranged so as to be minimum when the distance between the free end of the lashes of the wearer and the optical lens 3, 7 is greater than the length of the lashes.

The distance between a part of the face of the wearer and the optical equipment 1 includes, for example, the distance between an inferior part of the optical equipment 1 and the cheekbones and/or the cheeks of the wearer, regardless of the facial expression of the wearer. It is preferable that the cheekbones and/or the cheeks do not interfere with the optical lens 3, 7 as the cheekbones might stain the optical lens 3, 7.

For example, the comfort cost function C may be arranged so as to be minimum when the distance between the cheekbones and the optical element is large enough so that they do not interfere with regardless of the facial expression of the wearer.

Generally, it is preferable that the temple 13, 15 do not protrude far from the pinna of the wearer, as it might cause discomfort to the wearer when resting her/his head.

For example, the comfort cost function C may be arranged so as to be minimum when the length temples 13, 15 do not exceed a predetermined length beyond the pinna of the wearer.

The shape of the nose pad 17, 19 may be adapted to the nose of the wearer. For example, the size of the nose pad 17, 19 is adapted to the size of the nose of the wearer. The material of the pad 17, 19 is selected in order not to slide on the nose of the wearer. For example, the material may be selected based on the type of skin of the wearer and/or the wear conditions.

For example, the comfort cost function C may be arranged so as to be minimum when the pads 17, 19 are stable on the nose of the wearer.

If the pantoscopic angle α, representative of a tilt of rim 9, 11 with respect to temple 13, 15, is not well chosen, then rim 9, 11 might interfere with the face of the wearer.

For example, the comfort cost function C may be arranged so as to be minimum when the pantoscopic angle α is such that rim 9, 11 do not interfere with the face of the wearer.

During step S4, mechanical interaction cost function M is provided. Mechanical interaction cost function M varies as a function of a geometrical parameter of the spectacle frame 5 and a geometrical parameter of the optical lens 3, 7.

The geometrical parameter of the spectacle frame 5 is selected individually or in combination from a group comprising, but not limited to:
- a contour shape of the rim 9, 11 of the spectacle frame 5,
- at least a local thickness of the rim 9, 11 of the spectacle frame 5,
- a shape of the temple 13, 15 of the spectacle frame 5,
- a position of the hinge 27 on the spectacle frame 5,
- a position of a nose pad 23, 25 of the spectacle frame 5,
- a shape of a nose pad 17, 19 of the spectacle frame 5,
- a base curve of the rim of the spectacle frame 5, or more generally, a three dimensional contour shape of the rim of the spectacle frame 5, including but not limited to spherical or spherical-cylindrical shape,
- a geometry of the groove of spectacle frame 5 that will cooperate with a bevel of optical lens 3, 7,
- an absence of rim.

If the data relative to the wearer comprises morphology data of the wearer, then the geometrical parameter of the spectacle frame 5 may be based on said morphology data.

The geometrical parameter of the optical lens is selected from a group comprising, but not limited to:
- a thickness of optical lens 3, 7, the local thickness of the peripheral edge of optical lens 3, 7 is particularly relevant since it is the region in contact with spectacle frame 5,
- a base curve of optical lens 3, 7, or more generally, a three dimensional surface geometry of the back and front surfaces of optical lens 3, 7, including, but not limited to spherical, spherical-cylindrical, aspherical or progressive surfaces,
- a bevel geometry of optical lens 3, 7,
- a groove of optical lens 3, 7,
- a width w3, w7 of optical lens 3, 7.

For example, mechanical interaction cost function M may be arranged so as to be minimum when optical lens 3, 7 only interferes with rim 9, 11. In other words, the only element of the spectacle frame 5 in contact with optical lens 3, 7 is the rim 9, 11. Neither the temple 13, 15, their hinge 27 or the nose pad 17, 19 interferes with optical lens 3, 7.

For example, mechanical interaction cost function M may be arranged so as to be minimum when the thickness of the contour shape peripheral edge of optical lens 3, 7 is greater than a thickness threshold. The thickness is considered at least locally. This is particularly advantageous when spectacle frame 5 comprises a rimless frame. The thickness threshold then corresponds to the minimum thickness required so that optical lens 3, 7 is able to undergo drilling without breaking. The thickness of the peripheral edge should be greater than the threshold at least locally, in the drilling area, for mechanical interaction cost function M to be minimum.

For example, mechanical interaction cost function M may be arranged so as to be minimum when the contour shape of the peripheral edge of optical lens 3, 7 sensibly corresponds to the contour shape of an inner peripheral edge of rim 9, 11.

For example, mechanical interaction cost function M may be arranged so as to be minimum when the visibility of the edge of the mounted optical lens 3, 7 is minimum.

Additionally, during an optional step S6, an esthetic cost function E is provided. The esthetic cost function E relates to an esthetic parameter selected from a group including, but not limited to:

a contour shape of spectacle frame 5,
a visibility of an edge of optical lens 3, 7,
a color of the optical equipment 1,
a decorative pattern on spectacle frame 5.

It may be desirable to modify the contour shape of spectacle frame 5 so spectacle frame 5 is better adapted to the morphology of the wearer while keeping the same look.

It may also be desirable to reduce the visibility of the edge of the optical lens 3, 7 when mounted in spectacle frame 5.

For example, esthetic cost function E may be arranged so as to be minimum when the visibility of the edge of the mounted optical lens 3, 7 is minimum.

For example, esthetic cost function E may be arranged so as to be minimum when a size of a groove or a bevel of optical lens 5, 7 is small compared to the thickness of the peripheral edge of optical lens 3, 5.

It may be desirable to modify the color of optical equipment 1. For example, the wearer may desire to have spectacle frame 5 and optical lens 3, 7 of similar hue.

Alternatively, the hue of spectacle frame 5 and the hue of optical lens 3, 7 may be different. The hue of spectacle frame 5 and the hue of optical lens 3, 7 may be linked so that a change in one of the hues results in a change in the other hue so that the difference between the hues is preserved.

During step S5, the optical equipment 1 that minimizes global cost function G is determined. Global cost function G is a weighted sum of optical cost function O, comfort cost function C and mechanical interaction cost function M.

Optionally, when esthetic cost function E is provided, global cost function G is a weighted sum of optical cost function O, comfort cost function C, mechanical interaction cost function M and esthetic cost function E.

To minimize global cost function G, the method, comprises:

a step S51 of providing a model of the optical equipment 1 having a plurality of parameters, the parameters including an initial geometrical parameter of the optical lens 3, 7 adapted to the optical requirements of the wearer, and an initial geometrical parameter of the spectacle frame 5, a step S53 of evaluating the global cost function G of the model of the optical equipment 1, a step S55 of modifying a parameter of the model of the optical equipment 1.

The steps S53 and S55 are repeated so as to minimize the difference between the global cost function G and a target value of the global cost function G.

During step S51, a model of the optical equipment 1 is provided. This model of the optical equipment is, for example, a digital model provided by the processing device.

In a first implementation of step S51, the model of the optical equipment includes an initial geometrical parameter of optical lens 3, 7 adapted to the optical requirements of the wearer, the initial geometrical parameter of spectacle frame 5 corresponding for instance to the type of spectacle frame chosen by the wearer. The wearer may have chosen a given spectacle frame or may have selected a spectacle frame via a digital representation of the spectacle frame. According to an alternative embodiment, the initial spectacle frame may be determined independently from the wearer.

During step S53, the global cost function G of the model optical equipment is evaluated.

For example, optical equipment 1 is determined to comply with a set of constraints P1, P2, P3, P4 which are respectively taken into account into the optical cost function O, comfort cost function C, mechanical interaction cost function M, esthetic cost function E:

Constraint P1 relates to an optical function parameter. For example, according to constraint P1, optical lens 3, 7 power should remain as close as possible to the optical requirement of the wearer over the full field of view of the wearer.

In another example, according to constraint P1, the optical power should remain as close as possible to the optical requirement of the wearer at least over a part of the field of view provided by the contour shape of the rim of spectacle frame 5. For example, the optical power should remain as close as possible to the optical requirement of the wearer over 90% of the surface of optical lens 3, 7, while allowing a higher deviation in the remaining 10% of the surface of optical lens 3, 7. For example, higher deviation is allowed in the 10% of the surface of optical lens 3, 7 corresponding to an area of the surface in the vicinity of the peripheral edge of optical lens 3, 7. This higher deviation permits to change the thickness or geometry of optical lens 3, 7 and improves the cooperation between the peripheral edge of lens 3, 7 and the contour shape of the rim of spectacle lens 5.

Constraint P2 relates to a comfort parameter. For example, according to constraint P2, the width of spectacle frame 5 must comply with the width of the head of the wearer, for example 160 mm.

Constraint P3 relates to a geometrical parameter of the spectacle frame and a geometrical parameter of optical lens 3, 7. For example, according to constraint P3, rim 9, 11 must hold the edge of optical lens 3, 7 without breaking the edge of optical lens 3, 7. The thickness of the edge of the optical lens 3, 7 must be, for instance, greater than 0.6 mm.

Constraint P4 relates to an esthetic parameter. For example, the edge of the optical lens 3, 7 should be hidden by rim 9, 11.

Global cost function G is then defined by:

$$G(g_l, g_f) = \alpha O(g_l, g_f, P1) + \beta C(g_l, g_f, P2) + \gamma M(g_l, g_f, P3) + \delta E(g_l, g_f, P4)$$

Where $g_l$ is the geometry of optical lens 3, 7.
Where $g_f$ is the geometry of spectacle frame 5.
Where $\alpha$, $\beta$, $\gamma$ and $\delta$ are coefficients used to weigh each cost function O, C, M, E, and whose sum is equal to 1. The respective value of the coefficients $\alpha$, $\beta$, $\gamma$, $\delta$ is representative of the significance of a constraint. For example, if the main constraint is constraint P1, then coefficient $\alpha$ is greater than the other coefficients.

Here, optical cost function O is minimum when the geometry $g_l$ of optical lens 3, 7, and position of optical lens 3, 7 with respect to the head of the wearer, result in an optical lens power as close as possible to P1.

Comfort cost function C is minimum when the geometry $g_l$ of optical lens 3, 7 is such that the distance between temples 13, 15 is equal or close to the temporal distance of the wearer.

Mechanical interaction cost function M is minimum when the geometry $g_l$ of optical lens 3, 7 is such that the thickness of the edge of optical lens 3, 7 is greater than the minimum thickness of the edge of optical lens 3, 7.

Esthetic cost function E is minimum when the geometry $g_l$ of optical lens 3, 7 and the $g_f$ is the geometry of spectacle frame 5 give similar thickness for both the edge of optical lens 3, 7 and rim 9, 11.

In another example, the peripheral edge of optical lens 3, 7 is only partially hidden by rim 9, 11. According to constraint P4, the distance between the front lens edge, and the rim 9, 11 is constant along the whole contour shape of the rim. In this context, the front lens edge is the intersection between the peripheral edge of the optical lens and the front surface of the optical lens 3, 7. The distance is for example 1 mm. According to this example, the Esthetic cost function E is minimum when the distance between the front lens edge, and the rim 9, 11 is equal to 1 mm along the whole contour shape of the rim.

During the first implementation of step S53, the global cost function G is evaluated for a model of the optical equipment 1 that includes initial parameters of the optical lens 3, 7 and initial parameters of the spectacle frame 5.

During step S55, at least one parameter of the model of the optical equipment 1 is modified. Any of the geometrical parameters $g_f$ of the spectacle frame, geometrical parameters $g_l$ of the optical lens, comfort parameters, optical function parameters, esthetic parameters, may be modified. A plurality of the geometrical parameters $g_f$ of the spectacle frame, geometrical parameters $g_l$ of the optical lens, comfort parameters, optical function parameters, esthetic parameters, may be modified.

For example, to comply with constraint P2 and increase the comfort of the wearer, the width of spectacle frame 5 might be increased.

For example, to comply with constraint P4 and thus reduce the visibility of the edge of optical lens 3, 7, the thickness of the rim 9, 11 may be increased. Alternatively, in case of negative lenses, the width w3, w7 of optical lens 3, 7, may be reduced.

Optical function cost function O, comfort cost function C, mechanical interaction cost function M and esthetic cost function E may be jointly optimized in so far as they depend on a common set of morphological wearer data.

Steps S53 and S55 are repeated so as to minimize the difference between the global cost function G and a target value of the global cost function G.

The target value can be determined as a compromise between the optical/comfort/mechanical interaction criteria and the technical possibility offered either by the processing device and/or by the manufacturing system.

The target value may be equal to zero, in this case the global cost function G is minimized.

Optical equipment 1 is determined when optimum parameters that minimize the difference between the global cost function G and the target value are determined. The determined optical equipment 1 and the optimum parameters are then memorized in a file.

During a step S7, the determined optical equipment 1 is manufactured with a manufacturing system based on the memorized file.

To take in account the specificities of the manufacturing system, data descriptive of a manufacturing system are provided during a step S71, prior to step S5. For example the manufacturing may be very different for an additive manufacturing device than for a subtractive manufacturing device.

Such manufacturing data may then be used during step S5 by considering the technical parameters of the manufacturing systems identified by the manufacturing data. The global cost function G is then evaluated based on the technical parameters.

Different model of the optical equipment 1 may be determined based on different manufacturing systems. The global cost function G is then evaluated with each manufacturing system to determine which of the potential manufacturing system allows a greater minimization of the difference between the global cost function and the target value.

In an example, the determined optical equipment 1 is manufactured with an additive manufacturing machine.

Additive manufacturing is based on manufacturing technology such as defined in the international standard ASTM 2792-12, which mentions a process of joining materials to make objects from 3D model data, usually layer upon layer, as opposed to subtractive manufacturing methodologies, such as traditional machining.

The additive manufacturing method may be selected in, but is not limited to, the list consisting of stereolithography, mask stereolithography or mask projection stereolithography, polymer jetting, scanning laser sintering or SLS, scanning laser melting or SLM, fused deposition modeling or FDM.

Additive manufacturing technologies comprise processes which create objects by juxtaposition of volume elements according to a pre-determined arrangement that can be defined in a CAD (Computer Aided Design) file. Such a juxtaposition is understood as the result of sequential operations such as building a material layer on top of a previously obtained material layer and/or juxtaposing a material volume element next to a previously obtained volume element.

The additive manufacturing method allows to create almost any shape or geometric feature. Advantageously, using such additive manufacturing method provides much more freedom during the determining step S5.

According to the invention, at least part of the optical equipment may be manufactured using an additive manufacturing method.

For example, optical lens 3, 7 may be manufactured by additive manufacturing or some material may be added to either surface of optical lenses 3, 7 using an additive manufacturing method.

For example, optical lens 3, 7 of optical equipment 1 determined may be made of transparent materials of different densities.

According to an embodiment of the invention, at least part of spectacle frame 5 is intended to be manufactured using an additive manufacturing method.

As an alternative, spectacle frame 5 may be manufactured using additive manufacturing technologies, while optical lens 3, 7 may be manufactured using free form technology. The free form technology is used to modify both front and back surfaces from a blank lens, and to modify one unfinished surface from a semi finished lens.

The invention claimed is:

1. A method for determining an optical equipment adapted to a wearer, the optical equipment comprising an optical lens and a spectacle frame, the method being implemented by a processing device and comprising:

obtaining data relative to the wearer comprising optical requirements of the wearer;

obtaining an optical cost function, the optical cost function being related to an optical function parameter of the optical lens and being defined based at least on part of the data relative to the wearer;

obtaining a comfort cost function, the comfort cost function being related to a comfort parameter;

obtaining a mechanical interaction cost function, the mechanical interaction cost function varying as a function of a geometrical parameter of the spectacle frame and a geometrical parameter of the optical lens, the mechanical interaction cost function being arranged so as to be minimum when the optical lens only interferes with a rim; and determining the optical equipment that minimizes a global cost function, the global cost function being a weighted sum of the optical cost function, the comfort cost function and the mechanical interaction cost function.

2. The method according to claim 1, wherein the geometrical parameter of the spectacle frame is selected from a group comprising: a contour shape of a rim of the spectacle frame, at least a local thickness of the rim of the spectacle frame, a shape of a temple of the spectacle frame, a position of a hinge on the spectacle frame, a position of a nose pad of the spectacle frame, a shape of a nose pad of the spectacle frame, a base curve of the rim of the spectacle frame, an absence of rim, a geometry of a groove of the spectacle frame.

3. The method according to claim 1, wherein the comfort parameter is selected from a group comprising: a weight of the optical equipment, a distance between a part of a face of the wearer and the optical equipment when worn by said wearer, a length of the temple, a shape of the nose pad, a size of the spectacle frame, a pantoscopic angle, a wrap angle.

4. The method according to claim 1, wherein the geometrical parameter of the optical lens is selected from a group comprising: a thickness constraint of the optical lens, a size of the optical lens, a base curve of the optical lens, a bevel geometry of the optical lens, a groove of the optical lens.

5. The method according to claim 1, wherein the data relative to the wearer further comprises morphology data related to morphology of the wearer, and wherein the geometrical parameter of the spectacle frame is determined based on said morphology data.

6. The method according to claim 1, further comprising:
obtaining a model of the optical equipment having a plurality of parameters, the parameters including an initial geometrical parameter of the optical lens adapted to the optical requirements of the wearer, and an initial geometrical parameter of the spectacle frame, evaluating the global cost function of the model of the optical equipment, and modifying a parameter of the model of the optical equipment, wherein the evaluating and modifying are repeated so as to minimize a difference between the global cost function and a target value of the global cost function.

7. The method according to claim 6, wherein at least the geometrical parameter of the optical lens and the geometrical parameter of the spectacle frame are modified during the modifying.

8. The method according to claim 6, wherein the model parameters are further selected from a group including: a material of the optical lens, a coating of the optical lens, a material of the spectacle frame, a weight distribution of the spectacle frame, a weight distribution of the optical lens, and wherein further model parameters are to be modified during the modifying.

9. The method according to claim 6, further comprising:
obtaining data descriptive of a manufacturing system,
wherein the parameters of the model of the optical equipment include the data of the manufacturing system.

10. The method according to claim 9, wherein the manufacturing system includes at least an additive manufacturing machine.

11. A processing device for determining an optical equipment adapted to a wearer, the optical equipment comprising an optical lens and a spectacle frame, the processing device comprising:
a microprocessor; and
a memory storing a computer program, the computer program being adapted to, when executed by the microprocessor:
obtaining data relative to the wearer comprising optical requirements of the wearer,
obtaining an optical cost function, the optical cost function being related to an optical function parameter of the optical lens and being defined based at least on part of the data relative to the wearer,
obtaining a comfort cost function, the comfort cost function being related to a comfort parameter,
obtaining a mechanical interaction cost function, the mechanical interaction cost function varying as a function of a geometrical parameter of the spectacle frame and a geometrical parameter of the optical lens, the mechanical interaction cost function being arranged so as to be minimum when the optical lens only interferes with a rim, and
determining the optical equipment that minimizes a global cost function, the global cost function being a weighted sum of the optical cost function, the comfort cost function and the mechanical interaction cost function.

* * * * *